United States Patent
Yamaura et al.

(10) Patent No.: US 10,304,104 B2
(45) Date of Patent: May 28, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Yusuke Yamaura, Kanagawa (JP); Takeshi Onishi, Kanagawa (JP); Masatsugu Tonoike, Kanagawa (JP); Jun Shingu, Kanagawa (JP); Daisuke Ikeda, Kanagawa (JP); Yusuke Uno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 298 days.

(21) Appl. No.: 15/230,953

(22) Filed: Aug. 8, 2016

(65) Prior Publication Data
US 2017/0278162 A1 Sep. 28, 2017

(30) Foreign Application Priority Data
Mar. 25, 2016 (JP) .................. 2016-061559

(51) Int. Cl.
*G06Q 30/00* (2012.01)
*G06Q 30/06* (2012.01)
*G06K 9/00* (2006.01)

(52) U.S. Cl.
CPC ..... *G06Q 30/0613* (2013.01); *G06K 9/00302* (2013.01)

(58) Field of Classification Search
CPC ............ G06Q 30/0613; G06K 9/00302; G06F 17/60; G06F 3/015; A61B 3/113
USPC ............................................. 705/26.41, 26.1
See application file for complete search history.

(56) References Cited

U.S. PATENT DOCUMENTS

| | | | | |
|---|---|---|---|---|
| 5,247,433 A | * | 9/1993 | Kitaura | G06F 3/011 376/216 |
| 2004/0153373 A1 | * | 8/2004 | Song | G06Q 30/02 705/26.1 |
| 2013/0021462 A1 | * | 1/2013 | Kadoya | A61B 5/18 348/78 |

FOREIGN PATENT DOCUMENTS

| | | |
|---|---|---|
| JP | 2007-006427 A | 1/2007 |
| JP | 2008-015942 A | 1/2008 |
| JP | 2008-040758 A | 2/2008 |
| JP | 2008-052683 A | 3/2008 |
| JP | 2008-245168 A | 10/2008 |
| JP | 2008-288707 A | 11/2008 |

OTHER PUBLICATIONS

2013-A33280, Jan. 2013, Derwent, Khiat et al.*
2008-K14914, Sep. 2008, Derwent, Kusaka Y.*

* cited by examiner

*Primary Examiner* — Yogesh C Garg
(74) *Attorney, Agent, or Firm* — Oliff PLC

(57) ABSTRACT

An information processing apparatus includes a detection unit that detects an orientation of the face of a customer in a store, an estimating unit that estimates the customer's state of mind in accordance with a chronological change of the detected orientation of the face of the customer, and an output unit that outputs guidance information that guides the customer to a customer service, in accordance with the estimated customer's state of mind.

12 Claims, 9 Drawing Sheets

FIG. 3

| ORIENTATION OF FACE | LOCATION AND MOVEMENT | STATE OF MIND | PRIORITY |
|---|---|---|---|
| NUMBER OF CHANGES PER UNIT TIME BEING EQUAL TO OR ABOVE THRESHOLD VALUE | DISTANCE OF TRAVEL EQUAL TO OR BELOW THRESHOLD VALUE | TO LOOK FOR STORE CLERK | 3 |
| SEEING DISPLAY SHELF | AT OR NEAR DISPLAY SHELF | TO LOOK FOR PRODUCT | 5 |
| STORES CLERKS AT MULTIPLE LOCATIONS CUSTOMER TURNS HEAD TO | DISTANCE OF TRAVEL EQUAL TO OR BELOW THRESHOLD VALUE | TO ASK STORE CLERK QUESTIONS | 2 |
| NUMBER OF CHANGES PER UNIT TIME BEING EQUAL TO OR ABOVE THRESHOLD VALUE | AT OR NEAR CHECKOUT | TO MAKE PAYMENT | 1 |
| NUMBER OF CHANGES PER UNIT TIME BEING EQUAL TO OR ABOVE THRESHOLD VALUE | AT OR NEAR MIRROR | TO TRY CLOTHES ON | 4 |
| OTHER ORIENTATION | OTHER LOCATIONS | CUSTOMER SERVICE NOT NEEDED | — |

FIG. 4

| DISPLAY SHELF | SHELF LOCATION | PRODUCT | STOCK |
|---|---|---|---|
| 510A | (XA, YA) | WHITE SHIRT | ... |
| 510B | (XB, YB) | SHOES | ... |
| ... | ... | ... | ... |
| 510H | (XH, YH) | HAT | ... |

FIG. 5

| SEQUENTIAL ORDER OF CUSTOMER SERVICES | CUSTOMER LOCATION | GUIDANCE INFORMATION |
|---|---|---|
| 1 | (X1, Y1) | LOOKING FOR STORE CLERK |
| 2 | (X2, Y2) | LOOKING FOR SHOES |
| ... | ... | ... |

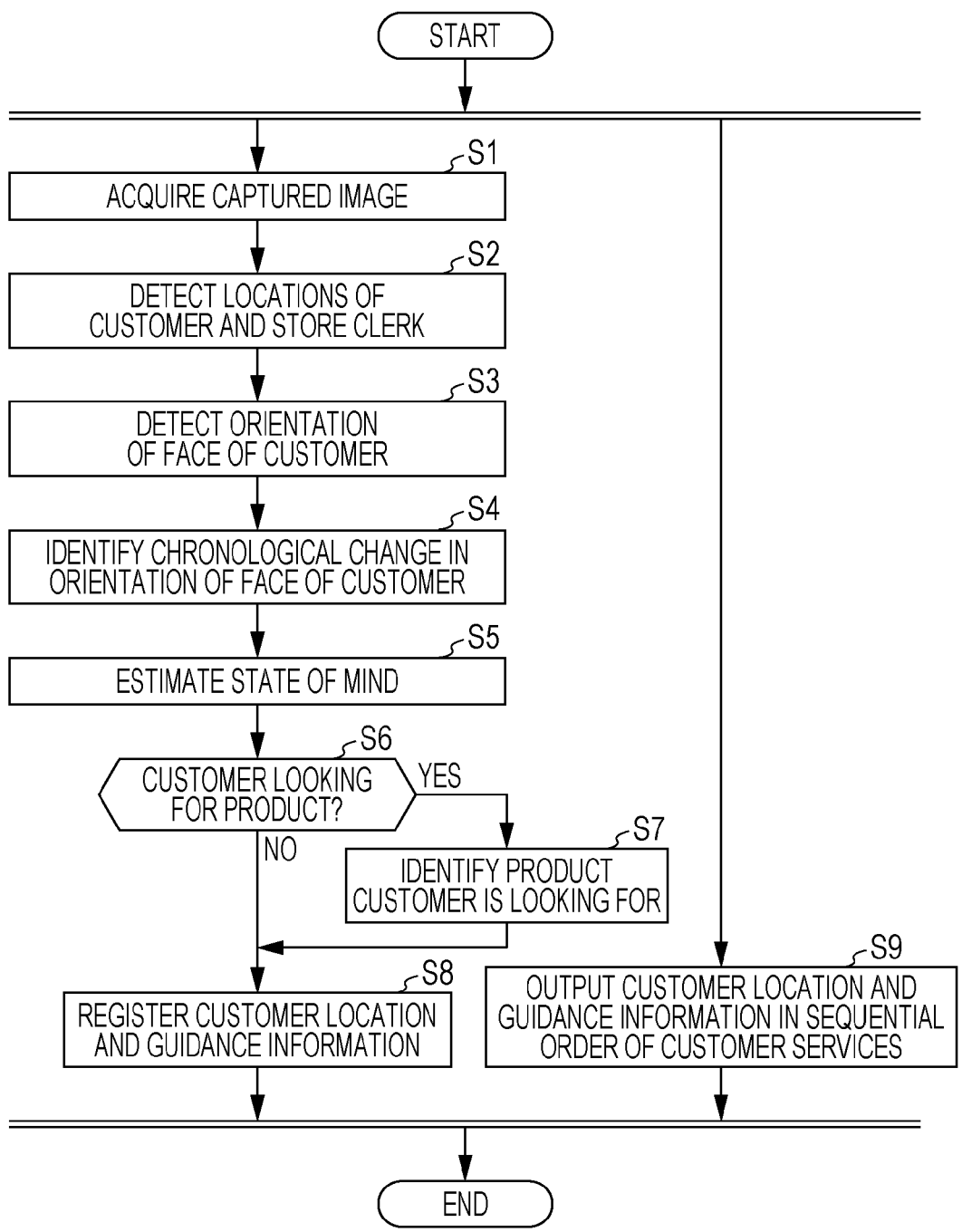

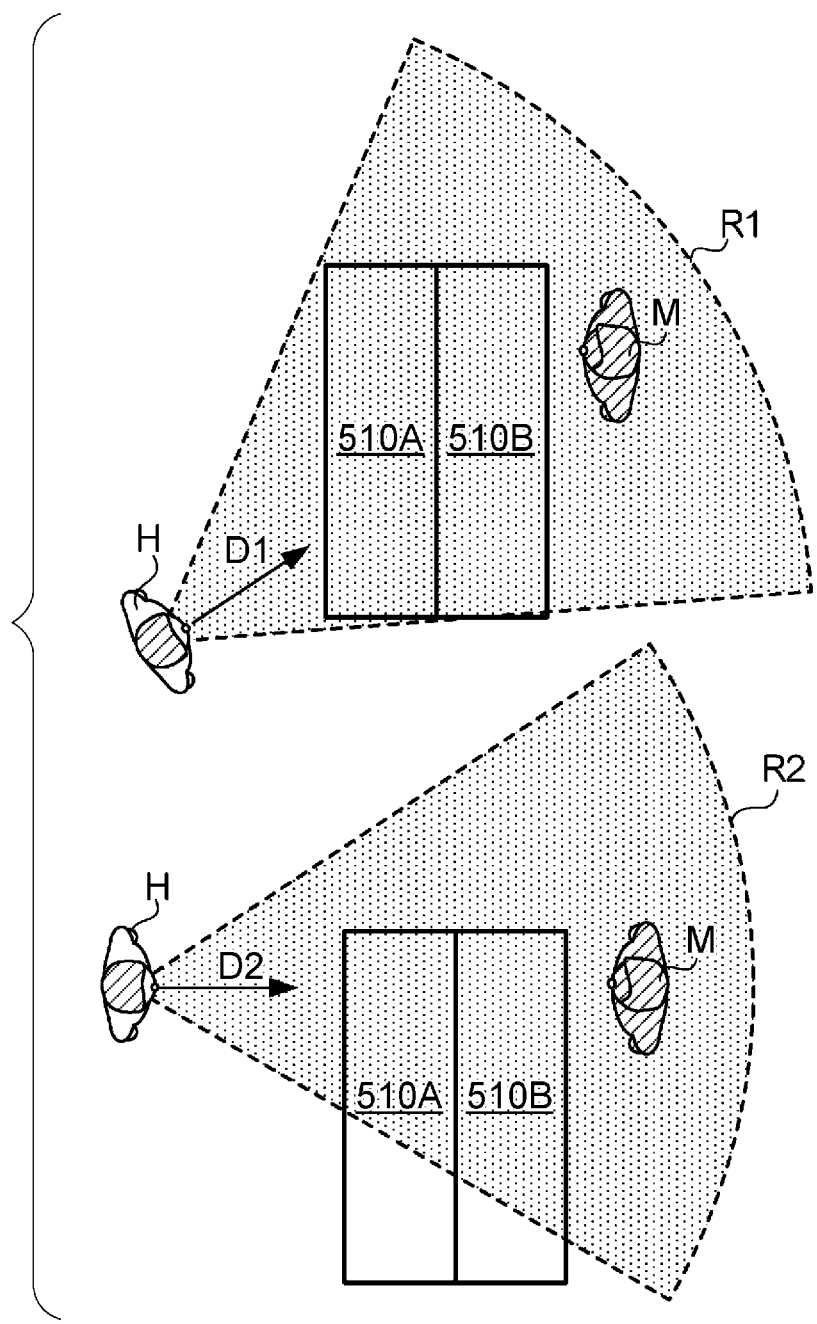

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-061559 filed Mar. 25, 2016.

BACKGROUND (i) Technical Field

The present invention relates to an information processing apparatus, an information processing method, and a non-transitory computer readable medium.

(ii) Related Art

Techniques have been disclosed to monitor the motion of a person with cameras, and estimates the state of mind and the pattern of motions of the person.

SUMMARY

According to an aspect of the invention, there is provided an information processing apparatus. The information processing apparatus includes a detection unit that detects an orientation of the face of a customer in a store, an estimating unit that estimates the customer's state of mind in accordance with at least a chronological change of the detected orientation of the face of the customer, and an output unit that outputs guidance information that guides the customer to a customer service, in accordance with the estimated customer's state of mind.

BRIEF DESCRIPTION OF THE DRAWINGS

Exemplary embodiments of the present invention will be described in detail based on the following figures, wherein:

FIG. 3 illustrates a configuration of the state-of-mind database of the first exemplary embodiment;

FIG. 4 illustrates a configuration of a product management database of the first exemplary embodiment;

FIG. 5 illustrates a configuration of a guidance information database of the first exemplary embodiment;

FIG. 6 is a flowchart illustrating a process that is performed by the information processing apparatus of the first exemplary embodiment;

FIG. 7B illustrates a relationship between the behavior of the customer and the state of mind of the customer in accordance with the first exemplary embodiment.

DETAILED DESCRIPTION

First Exemplary Embodiment

Figure 1:
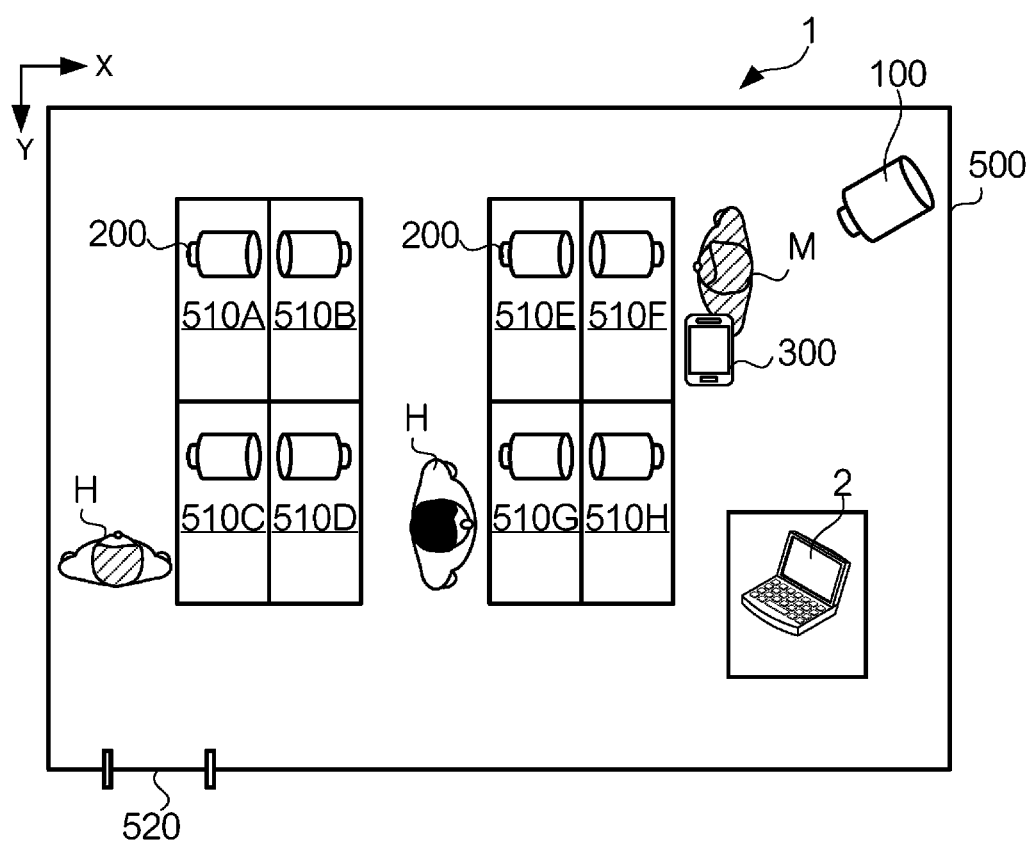
FIG. 1 generally illustrates an information processing system of a first exemplary embodiment of the present invention.

FIG. 1 generally illustrates an information processing system 1 of a first exemplary embodiment of the present invention. FIG. 1 is a plan view of a store 500. As illustrated in FIG. 1, the image of a clerk M is hatched to differentiate from a customer H. The number of customer H and clerk M are illustrated for exemplary purposes, and multiple customers H and multiple clerks M may be present in the store 500.

The store 500 may be one of various types of stores, such as a convenience store, a supermarket, and a department store. In the first exemplary embodiment, the store 500 is a clothing store that sells clothes. The store 500 includes multiple display shelves 510 that are examples of a product display section where products are displayed. The display shelves 510 include eight display shelves (display shelves 510A through 510H). The customer H having entered the store 500 via a doorway 520 may select a desired product from among products displayed on the display shelf 510, and make payment for the product. The clerk M performs a customer service, such as guiding the customer H to a product sold in the store 500. The customer service may include a variety of business activities the clerk M performs on the customer H, for example, giving information about the store 500 or products (for example, guiding the customer H to products or a selling area of the products), replying to questions from the customer H, and processing payment for the purchase of the product. The clerk M carries a clerk terminal 300 that is a radio communication terminal for clerk. The clerk terminal 300 may be a radio communication terminal, such as a smart phone, or a transceiver. The clerk terminal 300 may also be a wearable radio communication terminal, such as a headset or a wristwatch.

An imaging device 100 is installed in the store 500 to capture an inside image of the store 500 from above. The imaging device 100 is configured to image entirely the inside of the store 500. Multiple imaging devices 100 may be installed, as appropriate. Each of the display shelves 510A through 510H is provided with an imaging device 200 that is configured to capture an inside image along the flow line of each customer H. The imaging devices 100 and 200 are cameras that capture moving images.

The information processing system 1 assists clerks in customer service by estimating the state of mind of the customer H. The information processing apparatus 2 in the information processing system 1 supports clerks in the customer service in response to captured images from the imaging devices 100 and 200. The information processing apparatus 2 is a computer installed at the checkout of the store 500, but may be a computer other than the one installed at the checkout.

Figure 2:
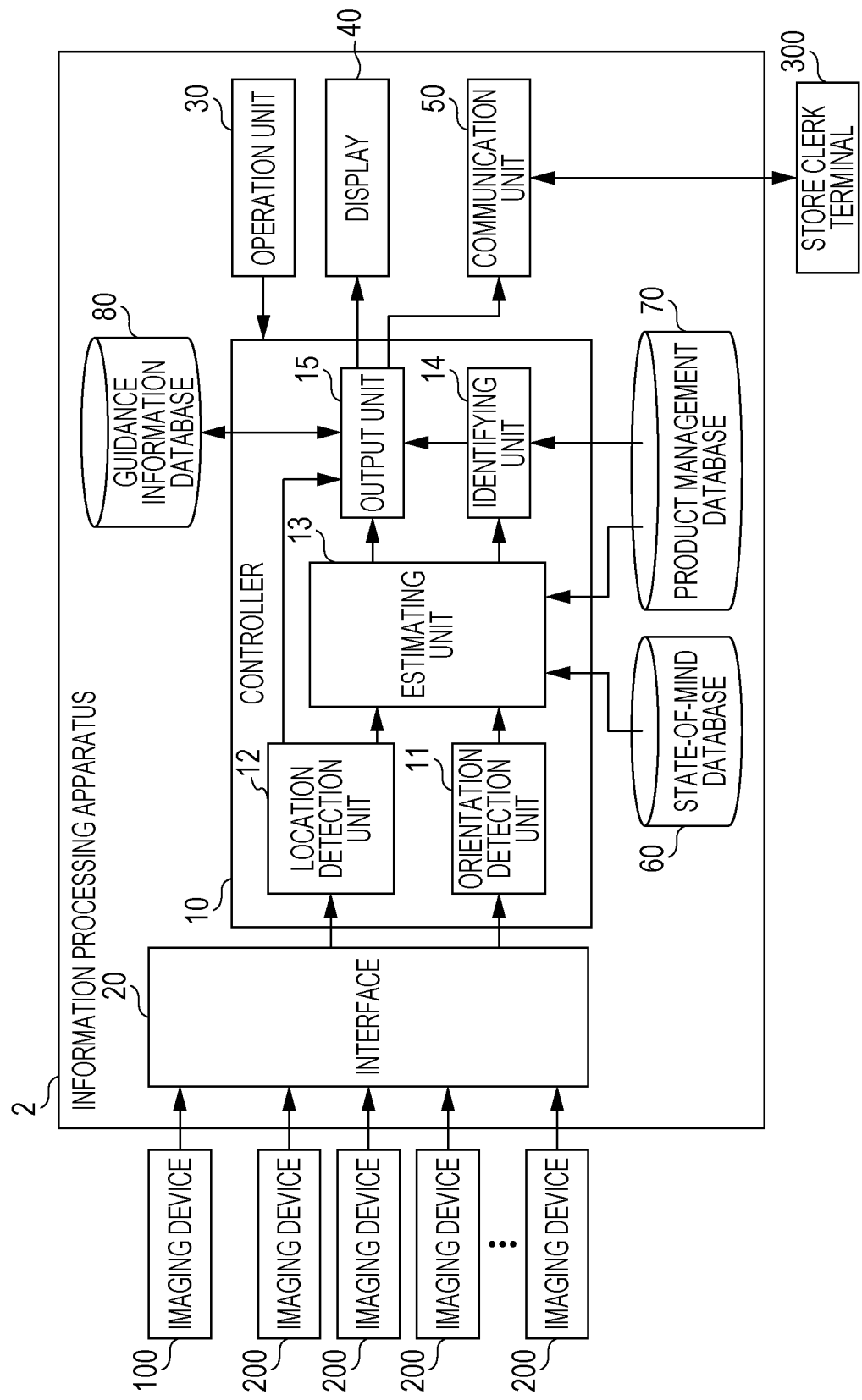
FIG. 2 is a block diagram illustrating an information processing apparatus of the first exemplary embodiment.

FIG. 2 is a block diagram illustrating the information processing apparatus 2 of the first exemplary embodiment. The information processing apparatus 2 includes a controller 10, an interface 20, an operation unit 30, a display 40, a communication unit 50, a state-of-mind database 60, a product management database 70, and a guidance information database 80.

The controller 10 includes a processor including a central processing unit (CPU), a read-only memory (ROM), and a random-access memory (RAM), and an image processing circuit, such as an application specific integrated circuit (ASIC). The CPU controls each element of the information processing apparatus 2 by reading a program from the ROM onto the RAM, and executing the program. The image processing circuit is controlled by the CPU, and performs a variety of image processing operations.

The interface 20 connects to each of the imaging devices 100 and 200. The imaging devices 100 and 200 capture images, and outputs the captured images to the interface 20. The operation unit 30 includes a touchsensor or a physical key, and receives an operation performed on the touchsensor or the physical key by a user. The display 40 includes a liquid-crystal display, and displays an image on the display screen thereof. The communication unit 50 includes a modem, and is connected to a communication network, such as the Internet or a local area network (LAN), for communication. The communication unit 50 may perform radio communication with the clerk terminal 300.

The state-of-mind database 60, the product management database 70, and the guidance information database 80 may be constructed of one or more storage devices (such as a hard disk device).

FIG. 3 illustrates a configuration of the state-of-mind database 60. The state-of-mind database 60 associates an "orientation of the face of the customer", a "location and movement of the customer", a "state of mind of the customer", and a "priority".

The "orientation of the face" represents a chronological change of the orientation of the face, or the orientation of the face at a given time point. The chronological change of the orientation of the face refers to the number of times the orientation of the face has changed within unit time. Alternatively, the chronological change of the orientation of the face may refer to an amount of change in the angle of the orientation of the face. In this case, the amount of change in the angle of the orientation of the face is the sum of absolute values of angular amount of changes per unit time. The "location and movement" represent a location of the customer H at a given time point or a distance of travel of the customer H (namely, a chronological change of the location of the customer H). The "state of mind" represents a state of mind of the customer H that is estimated by referencing the information of the "orientation of the face of the customer", and the "location and movement". The "priority" is identified by the customer's state of mind and indicates a priority according to which the customer services are to be performed. The smaller value the priority is, the higher priority the customer service is to be performed with.

The state-of-mind database 60 stores information determined at a design phase, or information set in the operation of the operation unit 30.

FIG. 4 illustrates a configuration of the product management database 70. The product management database 70 associates a "display shelf", a "shelf location", a "product", and a "stock".

The "display shelf" uniquely identifies the display shelf 510. Referring to FIG. 4, the display shelves 510A through 510H are installed in the store 500. The "shelf location" represents where the display shelf 510 is arranged in the store 500. The shelf location is represented in an XY coordinate system of FIG. 1. The XY coordinate system is a rectangular coordinate system that represents a position in the plane of the store 500. The "product" indicates a product displayed on the display shelf 510. The column "product" may list information of multiple products (all the products) displayed on the display shelf 510. The "stock" represents the status of the stock of the products (for example, the presence or absence of products, or the quantity of products in stock).

The product management database 70 may register information set using the operation unit 30, or may register information in cooperation with a computer that is separately arranged for inventory management of stock.

FIG. 5 illustrates a configuration of the guidance information database 80. The guidance information database 80 associates "sequential order of customer services", a "customer location", and "guidance information".

The "sequential order of customer services" represents the order according to which the customer services are performed to multiple customers H. The "customer location" indicates the location of a customer to whom a customer service is performed. As the shelf location, the customer location is expressed using the XY coordinate system. The "guidance information" is used by a clerk when the clerk performs the customer service. The guidance information at least includes information related to the customer service responsive to the state of mind of the customer H. If the state of mind of the customer H indicates that the customer H is now looking for a given product, the guidance information may include information related to that product.

Turning to FIG. 2, the controller 10 implements functions corresponding to an orientation detection unit 11, a location detection unit 12, an estimating unit 13, an identifying unit 14, and an output unit 15.

The orientation detection unit 11 detects an orientation of the face of the customer H in the store 500. The orientation detection unit 11 analyzes the captured images from the imaging devices 100 and 200 using related-art image recognition technique, and detects the orientation of the face of the customer H.

The location detection unit 12 detects the location of the customer H in the store 500. The location detection unit 12 analyzes the captured images from the imaging devices 100 and 200 using the related-art image recognition technique, and detects the location of each customer H. In accordance with the first exemplary embodiment, the location detection unit 12 detects the location of the clerk M in a similar fashion. The customer H may be differentiated from the clerk M by recognizing a feature of external view of the clerk M (such as a feature of a uniform of the clerk M), or by operating the operation unit 30.

An example of a method of recognizing the clerk M is described below. Stores typically include a region that is off-limits to customers, namely, a special region where authorized persons only, such as clerks, are allowed to enter. The special region may be an accounting section. The location detection unit 12 recognizes a person that enters the special region in the store 500 as the clerk M. The clerk M also typically enters through a doorway different from that for customers. The location detection unit 12 may recognize a person having entered through the doorway for clerks or a person staying near the doorway for clerks as the clerk M when the opening or the closing of the door at the doorway for clerks is detected. Alternatively, a button or card reader as an example of the operation unit 30 may be installed near the doorway for clerks. The location detection unit 12 may recognize a person close to the button or the card reader when the pressing of the button is detected or when the card reader has read a clerk certificate held by the clerk M only.

Once a person is recognized as the clerk M, the location detection unit 12 keeps track of the person with attribute information that the person is the clerk M, and thus continuously recognizes the clerk M. In contrast, customers typically enter through the customer doorway. For this reason, the location detection unit 12 recognizes as a customer H a person who has entered through the customer doorway and then keeps track of the person as the customer H.

The detection method of the location of the customer may be free from using the capture image. The location detection unit 12 may receive a particular signal from the clerk terminal 300, and then identify the clerk terminal 300 and the location of the clerk M carrying the clerk terminal 300. For example, the location detection unit 12 may detect the location of the clerk M by associating a position fixing signal provided by the global positioning system (GPS) as the particular signal with identification information of the clerk terminal 300 and by managing the particular signal and the identification information. Without the need to use the GPS, the location detection unit 12 may detect where the clerk M is by detecting an access point radio-linked to the clerk terminal 300.

The estimating unit 13 estimates the state of mind of the customer H, based on the orientation of the face of the customer H detected by the orientation detection unit 11 and the location of the customer H detected by the location detection unit 12. More specifically, the estimating unit 13 estimates the state of mind of the customer H by checking the chronological change of the orientation of the face the customer H, the orientation of the face at a given time point, the location of the customer H at the given time point, and the movement of the customer H against the state-of-mind database 60. The estimating unit 13 thus estimates the customer H's state of mind.

If the customer H is in a state of mind prepared to look for a given product, the identifying unit 14 identifies that product. More specifically, if the display shelf 510 is located in a direction the customer H turns his or her head to, the identifying unit 14 identifies products displayed on the display shelf 510 in accordance with the product management database 70. It is likely that a product the customer H is looking for is present among the products.

Based on the state of mind of the customer H estimated by the estimating unit 13, the output unit 15 outputs the guidance information that guides the customer H through the customer service. If the customer H is in the state of mind prepared to look for a given product, the output unit 15 outputs the guidance information related to the product identified by the identifying unit 14.

More specifically, if the estimating unit 13 estimates that the customer H is in the state of mind prepared to use the customer service, the output unit 15 registers on the guidance information database 80 the guidance information that associates the sequential order of customer services responsive to the state of mind with the customer location. The output unit 15 reads from the guidance information database 80 the customer location and the guidance information in the sequential order of customer services, and outputs the customer location and the guidance information. In accordance with the first exemplary embodiment, the outputting of the customer location and guidance information is performed by displaying the customer location and guidance information on the display 40, transmitting the customer location and guidance information to the clerk terminal 300, or performing a combination of these operations.

Figure 7A:
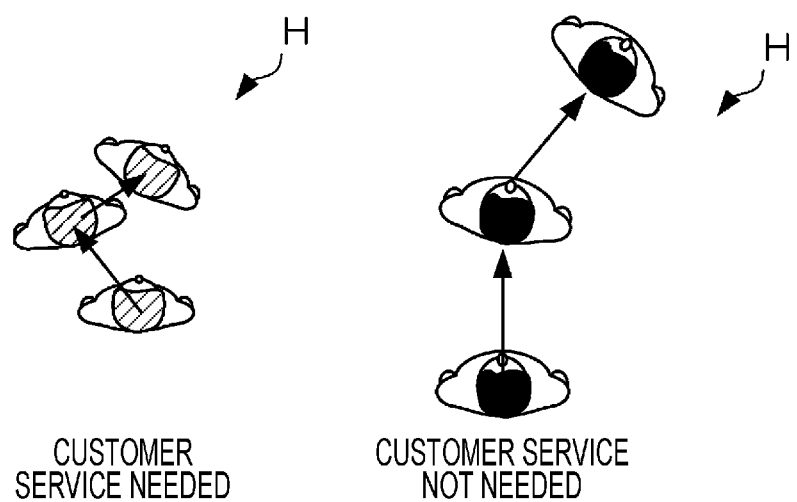
FIG. 7A illustrates a relationship between the behavior of a customer and the state of mind of the customer in accordance with the first exemplary embodiment.

FIG. 6 is a flowchart illustrating a process that is performed by the information processing apparatus 2. The information processing apparatus 2 performs in parallel an operation of registering the guidance information on the guidance information database 80 and an operation of reading the guidance information from the guidance information database 80 and outputting the guidance information. The information processing apparatus 2 performs the process of FIG. 6. FIG. 7A and FIG. 7B illustrate a relationship between the behavior and the state of mind of the customer H.

The registration of the guidance information is described below.

The controller 10 receives the captured images from the imaging devices 100 and 200 via the interface 20 (step S1). The controller 10 analyzes the image captured in step S1 and detects the locations of the customer H and the clerk M (step S2). The controller 10 detects the orientation of the face of the customer H at that moment (step S3). The controller 10 then identifies the chronological change of the orientation of the face of the customer H (step S4). For example, the controller 10 identifies how many times the customer H turns his or her head in orientation per unit time. The controller 10 then estimates the state of mind of the customer H (step S5).

As illustrated at a first row of the state-of-mind database 60 of FIG. 3, if the number of changes in the orientation of the face of the customer per unit time is equal to or above a threshold count, and the distance of travel of the customer during the period is equal to or below a threshold value, the controller 10 determines that the customer is in the state of mind prepared "to look for a clerk". Since the customer H may turn around while looking for a clerk as illustrated in the left-hand portion of FIG. 7A, the number of changes in the orientation of the face of the customer per unit time is likely to increase. Since the customer H tends to look for the clerk M who is possibly near the customer H, the distance of travel may not be so long. Conversely, the customer H may know the location of the display shelf 510 where a product desired by the customer H is displayed, and may not need a particular customer service from the clerk M. In such a case, as illustrated the right-hand portion of FIG. 7A, the number of changes in the orientation of the face of the customer per unit time is likely to be smaller, and the distance of travel during the period is likely to be longer.

If the customer H looks at the display shelf 510 and the location of the customer H is close to the display shelf 510 as illustrated at a second row of the state-of-mind database 60 of FIG. 3, the controller 10 determines that the customer H is in the state of mind prepared "to look for a product". In such a case, the customer H is likely to look for one of the products displayed on the display shelf 510.

If the clerk M is present where the customer H turns his or her head to by several times, and the distance of travel of the customer H during the period is equal to or below a threshold value as illustrated at a third row of the state-of-mind database 60 of FIG. 3, the controller 10 determines that the customer H is in the state of mind prepared "to ask the clerk questions".

If the customer H desires a customer service from the clerk M, the clerk M typically looks at the clerk M as illustrated in the upper portion of FIG. 7B. If the customer H, the display shelf 510A, and the clerk M are located in a positional relationship as illustrated in the upper portion of FIG. 7B, it is difficult to determine whether the customer H looks at the clerk M over the display shelf 510A or the products displayed on the display shelf 510A. The controller 10 then determines that the customer H is in the state of mind prepared "to ask the clerk M questions" if the clerks M are present at multiple locations the customer H looks at. For example, if a clerk M is present within a sector R1 with respect to a direction D1 at which the customer H looks, and the clerk M is then present within a sector R2 with respect to a direction D2 at which the customer H at a different location looks, the controller 10 determines that the customer H is in the state of mind prepared "to ask the customer H questions".

The sector R1 and R2 are fan-shaped areas having predetermined center angles. More specifically, the sector R1 and R2 are ranges, each centered at the location of the customer H and radially extending to a predetermined distance with respect to a predetermined direction.

If the number of changes in the orientation of the face of the customer H per unit time is equal to or above a threshold count and the location of the customer is close to the checkout as illustrated at a fourth row of the state-of-mind database 60 of FIG. 3, the controller 10 determines that the customer H is in the state of mind prepared "to make payment". This is because the customer H who wants to make payment may proceed to the checkout and may turn around to look for a nearby clerk M.

If the number of changes in the orientation of the face of the customer H per unit time is equal to or above a threshold count and the location of the customer is close to a mirror as illustrated at a fifth row of the state-of-mind database 60 of FIG. 3, the controller 10 determines that the customer H is in the state of mind prepared "to try clothes on". This is because the customer H who wants to try clothes on may proceed to the mirror and may turn around to look for a nearby clerk M.

The controller 10 determines that customers not applicable to any of the above cases are in the state of mind prepared "to use a customer service" as described at a sixth row of the state-of-mind database 60 of FIG. 3.

The condition related to the chronological change of the face orientation that the number of changes in the orientation of the face of the customer H per unit time is equal to or above a threshold count may be that an amount of angular change in the face orientation is equal to or above a threshold value, more specifically, that the sum of absolute values of amount of changes in the face orientation per unit time is equal to or above a threshold value.

Turning back to FIG. 6, the controller 10 estimates the state of mind of the customer H, and determines in accordance with the state of mind whether the customer H is looking for a product (step S6). If the determination result in step S6 is "no", the controller 10 registers on the guidance information database 80 the customer location, and the guidance information responsive to the estimated state of mind in the sequential order of customer services (step S8). The customer location is identified by the detection results of the location of the customer H in step S2.

If the determination result in step S6 is "yes", the controller 10 identifies a product by checking the display shelf 510 present in the orientation of the face of the customer H against the product management database 70 (step S7). More specifically, upon estimating that the customer H is in the state of mind prepared "to look for a product", the controller 10 proceeds to step S7. Upon identifying the product in step S7, the controller 10 proceeds to step S8.

A specific example of the guidance information registered on the guidance information database 80 is described below.

Upon estimating that the customer H is in the state of mind prepared "to look for a clerk" or "to ask a clerk questions", the controller 10 identifies the selling area in the store 500 where the customer H is present at that moment, and registers the guidance information including information related to the identified selling area. Upon estimating that the customer H is in the state of mind prepared to "to try clothes on", the controller 10 determines whether any fitting room is available, and then registers the guidance information. Upon estimating that the customer H is in the state of mind prepared "to make payment", the controller 10 checks the status of each checkout, and identifies whether any checkout is available if multiple checkout counters are available, and then registers the guidance information.

In order to estimate the state of mind of the customer H, and output the guidance information responsive to the state of mind, the controller 10 desirably identifies information needed by the customer H.

The outputting of the guidance information is described below.

The controller 10 outputs the customer location and guidance information registered on the guidance information database 80 in accordance with the sequential order of customer services on the guidance information database 80 (step S9). The controller 10 outputs the guidance information to the display 40, thereby causing the display 40 to display the contents of the guidance information, or transmits the guidance information to the clerk terminal 300, thereby notifying the clerk M of the contents of the guidance information. When the customer H is looking for a product on a display shelf 510, the controller 10 includes information of products displayed on the display shelf 510 and an inventory of stock in the guidance information and then outputs the resulting guidance information. The clerk M performs the customer service in response to the contents of the output guidance information. When the controller 10 is notified by the operation unit 30 or by the clerk M who uses the clerk terminal 300 that the customer service has been completed, the controller 10 outputs the guidance information having a customer service that is to be performed next in order.

The controller 10 determines the sequential order of customer services in accordance with the priority determined on each state of mind. The controller 10 may output the guidance information within a predetermined period of time beginning with the registration on the guidance information database 80 such that the waiting time for the customer service is not prolonged.

The guidance information output herein is described below.

If the controller 10 estimates that the customer H is in the state of mind prepared "to look for a product", the controller 10 outputs the guidance information to the clerk terminal 300 of the clerk M closer to the selling area of the product identified in step S7. The guidance information notifies the clerk M that the customer H in that state of mind is present. As previously described with reference to the information processing system 1, the clerk M is recognized or detected in response to the captured image or the particular signal transmitted by the clerk terminal 300. By learning where each of multiple clerks M is present every time point, the controller 10 may identify which selling area the clerk M is in, or who the clerk M is closer to a given display shell. After identifying the product the customer H is looking for, the controller 10 identifies the display shelf 510 displaying that product, and the location of the display shelf 510 in accordance with the product management database 70. The controller 10 further outputs the guidance information to the clerk terminal 300 of the clerk M present closer to the display shelf 510.

In this way, the controller 10 determines the clerk M who is available to perform the customer service needed by the customer H, and notifies the clerk M to provide the customer service to the customer H. The customer H may try to find multiple products or even if the controller 10 has identified the product, detailed information of the product, such as size and color may be unknown. In such a case, the controller 10 may extract from the product management database 70 information related to the stock of the products the customer H is looking for, and may output stock information in terms of product, size, or color.

If the controller 10 estimates that the customer H is in the state of mind prepared "to make payment" or "to ask the clerk questions", the customer H may possibly want to know about the product displayed in the selling area where the customer H is present. The controller 10 thus includes, in the guidance information, information related to the customer H and the customer location, and then transmits the resulting guidance information to the clerk terminal 300 of the clerk M who has a knowledge of the product (a group of products) handled at the selling area.

If there is present registered data that includes information of the product group (genre of products) with which each clerk M is particularly familiar, the controller 10 may determine the clerk terminal 300 to which the guidance information is output, based on that data. If each clerk M is in charge of his or her own selling area or product group, the controller 10 may determine the clerk terminal 300 as an output destination of the guidance information in view of person-in-charge information. If the customer H is found to be looking at the clerk M, the controller 10 may output the guidance information to the clerk terminal 300 of that clerk M. In this way, the controller 10 may notify the clerk M of the presence of the customer H who is likely to want a customer service from that clerk M.

If the customer H is in the state of mind prepared "to put clothes on", the controller 10 may identify information as to which fitting room is available, and output the guidance information including the information related to the available fitting room to the clerk terminal 300. In this way, the waiting time of the customer H is reduced while the customer H is guided to the available fitting room. If the clerk in charge of the fitting rooms is assigned, the controller 10 may output the guidance information to the clerk terminal 300 of that clerk M. The controller 10 may further identify a product which the customer H has tried on, and may output the guidance information to the clerk terminal 300 of the customer H who is in charge of the product. In this way, the clerk M more easily performs the customer service to the customer H after the try-on operation.

Upon estimating that the customer H is in the state of mind prepared "to make payment", the controller 10 may output the guidance information to the clerk terminal 300 of the clerk M in charge of the checkout to notify the clerk M of the presence of the customer H who wants to make payment. If the checkout is crowded, the clerk M in charge of the checkout may not perform the customer service to the customer H. In such a case, the controller 10 may identify a clerk M who is closer to the customer H at that moment, and may output to the clerk terminal 300 of that clerk M the guidance information including information as to which checkout is available.

In response to the state of mind of the customer H as described above, the controller 10 determines the guidance information to be output to the clerk M and the clerk M to whom the guidance information is output. In this way, one clerk M adequate in the customer service may provide the customer H with more appropriate information than when another clerk M simply provides the customer H with information in the customer service.

The information processing apparatus 2 of the first exemplary embodiment estimates the state of mind of the customer H having come to the store 500, and outputs the guidance information assisting the clerk M in the customer service in response to the estimation results. The information processing apparatus 2 thus assists the clerk M to provide the customer service to the customer H in view of the state of mind of the customer H.

Second Exemplary Embodiment

The information processing apparatus 2 may modify the condition of the outputting of the guidance information and the contents of the guidance information by updating the state-of-mind database 60 through learning the actually performed customer service.

Figure 8:
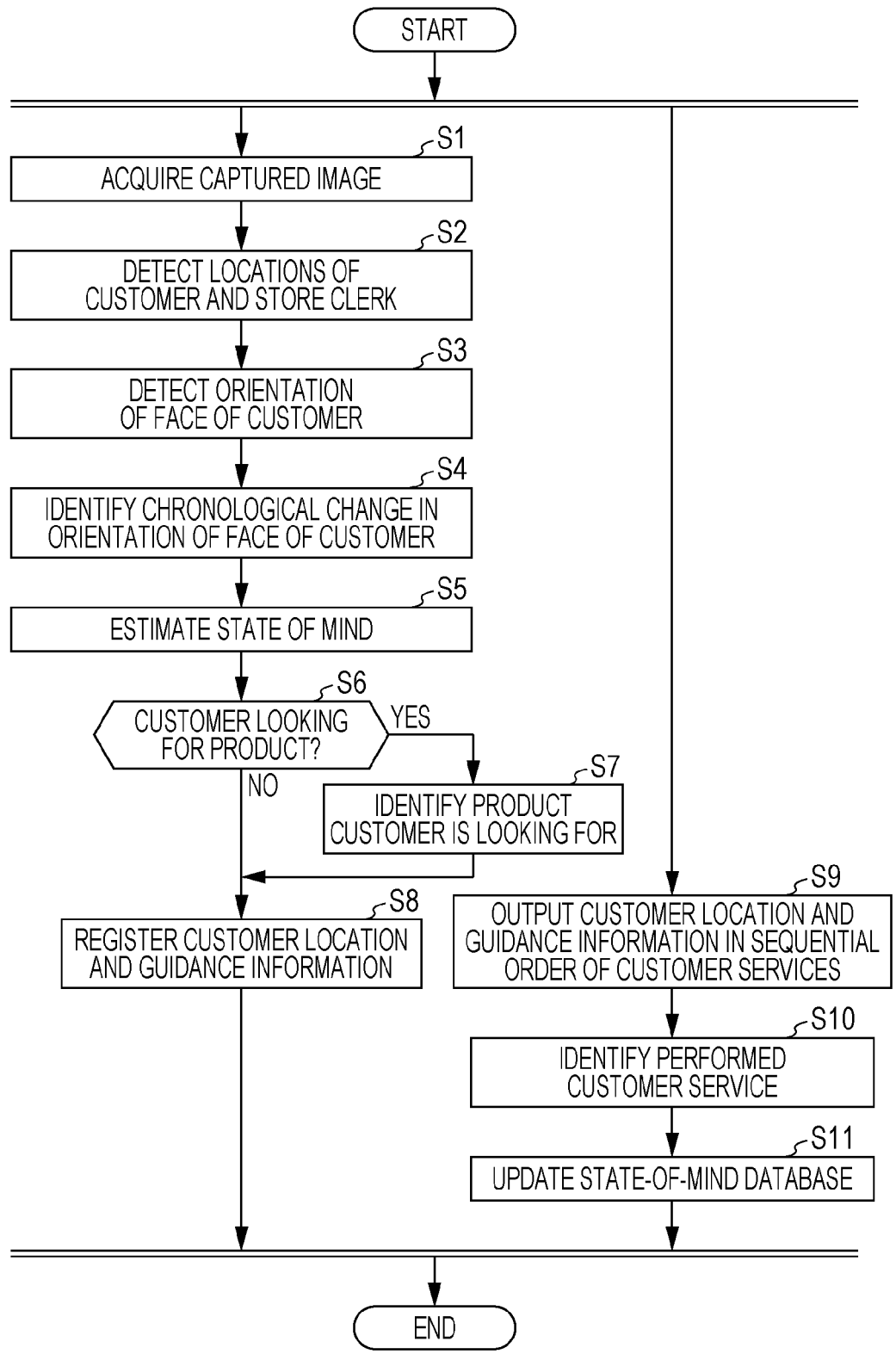
FIG. 8 is a flowchart illustrating a process that is performed by an information processing apparatus of a second exemplary embodiment of the present invention.

FIG. 8 is a flowchart illustrating a process that is performed by the information processing apparatus 2 of a second exemplary embodiment. Operations in steps S1 through S9 are identical to those in the first exemplary embodiment.

Upon performing the operation in step S9, the controller 10 identifies the customer service that is performed subsequent to the outputting of the guidance information in step S9 (step S10). The controller 10 receives via the operation unit 30 an input operation of information that indicates whether the contents of the guidance information and the customer service that has been performed by the clerk M in response to the contents of the output guidance information have been adequate.

The controller 10 updates the state-of-mind database 60, based on the relationship between the guidance information output in step S9 and the customer service identified in step S10 (step S11). For example, even if the controller 10 estimates that the customer H is in the state of mind prepared "to look for a clerk", the customer service may not be actually needed. In such a case, the controller 10 updates, to a smaller value, the threshold value on the number of changes in the orientation of the face and the threshold value on the distance of travel, those serving as the condition for estimating the state mind. The update method may be applicable to the states of mind prepared "to ask a clerk questions", "to make payment", and "to try clothes on". Even if the controller 10 estimates that the customer H is in the state of mind feeling "no necessity for customer service", a customer service could be actually needed. In such a case, the controller 10 identifies features in the orientation of the face of the customer H, the location of the customer H, and the pattern of movement, with the features served as a basis on the estimation of the state mind, associates the identified features with the state of mind feeling necessity of the customer service, and then registers the identified features and the state of mind on the state-of-mind database 60.

Figure 9:
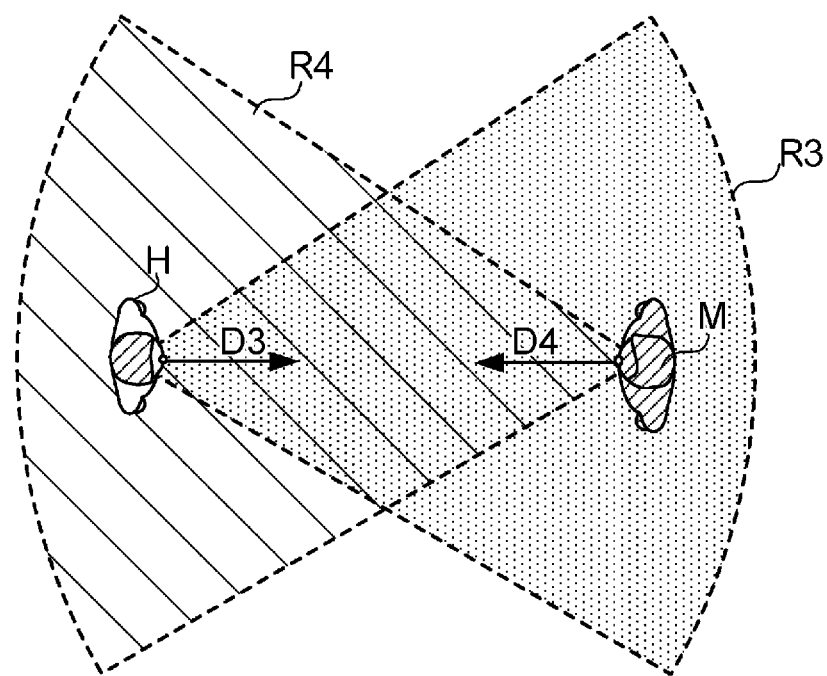
FIG. 9 illustrates an example of a particular method of identifying a customer service in accordance with the second exemplary embodiment.

The identification of the customer service in step S10 may be performed in accordance with analysis results of the captured image provided by the controller 10. As illustrated in FIG. 9, the clerk M is in a sector R3 with the center line thereof aligned with a direction D3 at which the customer H looks, and the customer H is in a sector R4 with the center line thereof aligned with a direction D4 at which the clerk M looks. The controller 10 determines that the clerk M performs the customer service to the customer H. Since the customer H and the clerk M are close to and look at each other, the controller 10 determines that the customer service is being performed.

The sectors R3 and R4 may be defined in a similar fashion as the sectors R1 and R2.

The information processing apparatus 2 of the second exemplary embodiment learns the actually performed customer service and reflects the customer service in the guidance information to be output. The information processing apparatus 2 thus assists the clerk M in the customer service more appropriately.

Modifications

The present invention may be implemented in a form different from the exemplary embodiments. The modifications of the exemplary embodiments described below may be used in combination.

In accordance with the exemplary embodiments, the controller 10 estimates the state of mind of the customer H using the orientation of the face of the customer H, and the positional relationship between the customer location and the display shelf 510. The controller 10 may further estimate the state of mind of the customer H using different information. For example, if the controller 10 estimates that the customer H is in the state of mind prepared "to look for a product", the controller 10 determines that the customer H is looking for a product related to the products displayed on the display shelf 510 near the customer H at that moment. Using information indicating which selling area the customer H has seen (for example, indicating the flow line), the controller 10 may estimate the state of mind more in detail. If the customer H has not yet picked up any product, or still carries an empty basket, and stays close to the display shelf 510 while seeing the display shelf 510, the controller 10 may estimate that the customer H is in the state of mind prepared "to look for a product".

In the exemplary embodiments, the controller 10 estimates that the customer H is in the state of mind prepared "to try clothes on" if the location of customer is close to the mirror. The controller 10 estimates more in detail the state of mind of the customer H using information whether the customer H is carrying a product or not.

The states of mind described in the exemplary embodiments have been described for exemplary purposes only. Stores the exemplary embodiments are applicable to are not limited to the clothing store. For example, in the case of a restaurant, the state of mind prepared "to look for a product" may be replaced with the state of mind prepared "to order food". The relationship between the behavior of a customer and the customer service needed by the customer is different depending on the type of stores. The state of mind may be estimated using a method responsive to the type of store.

In accordance with the exemplary embodiments, the information processing apparatus 2 estimates that the customer H is in the state of mind prepared "to ask a clerk questions" if the clerks M are present at multiple locations, each of which the customer H turns his or her head to. Alternatively, the information processing apparatus 2 may estimate that the customer H is in the state of mind prepared "to ask a clerk questions" if the customer H turns his or her head to at one location.

The orientation of the face of the customer H may be identified by the orientation of the line of sight of the customer H or the orientation of the body of the customer H.

The detection of the orientation and location of the face of the customer H is not limited to the method that involves the recognition of the captured image. For example, a device (such as a three-dimensional sensor) recognizing a gesture taken by the customer H or a distance sensor may be used in addition to or instead of the imaging device.

The hardware configuration and the functional configuration of the information processing apparatus 2 are not limited to those described with reference to the exemplary embodiments. Part of the hardware configuration or process of the information processing system described with reference to the exemplary embodiments may be omitted. For example, the information processing apparatus 2 may not necessarily have to include, in the guidance information, information of products the customer H is looking for and information of the stock of the products. In such a case, the information processing apparatus 2 is free from the product management database 70. The information processing apparatus 2 simply outputs the guidance information that includes at least a message that the customer service is needed.

The information processing apparatus 2 may directly output the guidance information without registering the guidance information on the guidance information database 80. In such a case, the information processing apparatus 2 is free from the guidance information database 80.

The functions of the controller 10 in the information processing apparatus 2 may be implemented using one or more hardware circuits, or may be implemented by a processing device that executes one or more programs, or may be implemented using a combination thereof. If the functions of the controller 10 are implemented using a program, the program may be supplied in a recorded state on a non-transitory computer readable recording medium or via a network. The non-transitory computer readable recording media include a magnetic recording medium (such as a magnetic tape, a magnetic disk, a hard disk drive (HDD), a flexible disk (FD)), an optical recording medium (such as an optical disk), a magneto-optical recording medium, and a semiconductor memory. The present invention may also include an information processing method that is performed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
   a detection unit that detects an orientation of the face of a customer in a store;
   an estimating unit that estimates the customer's state of mind in accordance with at least a chronological change of the detected orientation of the face of the customer;
   an output unit that outputs guidance information that guides the customer to a customer service, in accordance with the estimated customer's state of mind; and
   an identifying unit that identifies a product displayed on a product display section present in a direction the customer turns the head to, in accordance with a database that stores, in association with each other, a location of the product display section that is installed in the store and displays products, and information as to the products displayed on the product display section,
   wherein the output unit outputs the guidance information including information concerning the identified product.

2. The information processing apparatus according to claim 1, further comprising a location detection unit that detects a location of the customer,
   wherein the estimating unit estimates the customer's state of mind in accordance with the chronological change of the orientation of the face, and the detected location of the customer.

3. The information processing apparatus according to claim 2, wherein the output unit outputs the guidance information related to each of multiple customers in a sequential order reflecting the customers' states of mind.

4. The information processing apparatus according to claim 2, wherein the output unit modifies the guidance information in accordance with the customer service performed in response to previously output guidance information.

5. The information processing apparatus according to claim 2, wherein the estimating unit estimates the customer's state of mind prepared to use the customer service if the customer turns his/her head toward a direction, in which a store clerk is present, at each of multiple locations of the customer.

6. The information processing apparatus according to claim 5, wherein the output unit outputs the guidance information related to each of multiple customers in a sequential order reflecting the customers' states of mind.

7. The information processing apparatus according to claim 5, wherein the output unit modifies the guidance information in accordance with the customer service performed in response to previously output guidance information.

8. The information processing apparatus according to claim 1, wherein the output unit outputs the guidance information related to each of multiple customers in a sequential order reflecting the customers' states of mind.

9. The information processing apparatus according to claim 1, wherein the output unit modifies the guidance information in accordance with the customer service performed in response to previously output guidance information.

10. An information processing apparatus, comprising:
   a detection unit that detects an orientation of the face of a customer in a store;
   an estimating unit that estimates the customer's state of mind in accordance with at least a chronological change of the detected orientation of the face of the customer; and
   an output unit that outputs guidance information that guides the customer to a customer service, in accordance with the estimated customer's state of mind,
   wherein the output unit outputs the guidance information related to each of multiple customers in a sequential order reflecting the customers' states of mind.

11. An information processing method executed by a processor including a central processing unit of an information apparatus, comprising:
   detecting an orientation of the face of a customer in a store;
   estimating the customer's state of mind in accordance with a chronological change of the detected orientation of the face of the customer;
   outputting guidance information that guides the customer to a customer service, in accordance with the estimated customer's state of mind;
   identifying a product displayed on a product display section present in a direction the customer turns the head to, in accordance with a database that stores, in association with each other, a location of the product display section that is installed in the store;
   displaying products, and information as to the products displayed on the product display section; and
   outputting the guidance information including information concerning the identified product.

12. A non-transitory computer readable medium storing a program causing a computer to execute a process for processing information, the process comprising:
   detecting an orientation of the face of a customer in a store;
   estimating the customer's state of mind in accordance with a chronological change of the detected orientation of the face of the customer;
   outputting guidance information that guides the customer to a customer service, in accordance with the estimated customer's state of mind;
   identifying a product displayed on a product display section present in a direction the customer turns the head to, in accordance with a database that stores, in association with each other, a location of the product display section that is installed in the store;
   displaying products, and information as to the products displayed on the product display section; and
   outputting the guidance information including information concerning the identified product.

* * * * *